United States Patent
Hara

(10) Patent No.: US 7,630,514 B2
(45) Date of Patent: Dec. 8, 2009

(54) EMBEDDING AND EXTRACTING ADDITIONAL INFORMATION IN A DOCUMENT IMAGE

(75) Inventor: Takayuki Hara, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 797 days.

(21) Appl. No.: 11/296,351

(22) Filed: Dec. 8, 2005

(65) Prior Publication Data

US 2006/0147084 A1 Jul. 6, 2006

(30) Foreign Application Priority Data

Dec. 8, 2004 (JP) ............................. 2004-355485
Apr. 22, 2005 (JP) ............................. 2005-125305

(51) Int. Cl.
*G06K 9/00* (2006.01)
*G06K 9/66* (2006.01)
*H04N 1/40* (2006.01)

(52) U.S. Cl. .................... 382/100; 382/190; 358/3.28

(58) Field of Classification Search .............. 382/100, 382/190, 232, 251–253, 276; 713/176, 189; 358/328

See application file for complete search history.

(56) References Cited

U.S. PATENT DOCUMENTS

| | | | | |
|---|---|---|---|---|
| 5,629,770 A | * | 5/1997 | Brassil et al. | 358/426.12 |
| 5,784,491 A | * | 7/1998 | Koga | 382/232 |
| 6,086,706 A | * | 7/2000 | Brassil et al. | 156/277 |
| 6,222,932 B1 | * | 4/2001 | Rao et al. | 382/100 |
| 6,456,393 B1 | * | 9/2002 | Bhattacharjya et al. | 358/1.9 |
| 6,882,753 B2 | * | 4/2005 | Chen et al. | 382/251 |
| 7,260,238 B2 | * | 8/2007 | Iwamura et al. | 382/100 |
| 7,324,662 B2 | * | 1/2008 | Kot et al. | 382/100 |
| 2001/0009581 A1 | * | 7/2001 | Hashimoto | 380/205 |
| 2003/0021442 A1 | * | 1/2003 | Suzaki | 382/100 |
| 2003/0210803 A1 | * | 11/2003 | Kaneda et al. | 382/100 |
| 2005/0039021 A1 | * | 2/2005 | Alattar et al. | 713/176 |

FOREIGN PATENT DOCUMENTS

| | | |
|---|---|---|
| JP | 09-186603 | 7/1997 |
| JP | 2002-027245 | 1/2002 |
| JP | 2002-232679 | 8/2002 |
| JP | 2002-344911 | 11/2002 |
| JP | 2004-023563 | 1/2004 |

OTHER PUBLICATIONS

"Document Marking and Identification using both Line and Word Shifting," S. Low, N. Maxemchuk, J. Brassil, L. O'Gorman, Proceedings of IEEE INFOCOM'95, Boston MA, Apr. 1995.*
N. Chotikakamthorn. Electronic document data hiding technique using inter-character space. In Proc. of The 1998 IEEE Asia-Pacific Conference on Circuits and Systems, IEEE APCCAS 1998, pp. 419-422, Chiangmai, Thailand, Nov. 1998.*

* cited by examiner

*Primary Examiner*—Yubin Hung
*Assistant Examiner*—Andrae S Allison
(74) *Attorney, Agent, or Firm*—Dickstein Shapiro LLP

(57) ABSTRACT

Additional information is embedded to a document image by: analyzing a layout of a document image, the layout comprising a character line having a plurality of intercharacter spaces, each intercharacter space having an original length; and embedding additional information into the character line by changing the original length to an optimal length for each of the plurality of intercharacter spaces. The additional information may be further extracted from the document image.

26 Claims, 17 Drawing Sheets

FIG. 8

MINIMIZE $\quad J(s) = \sum_{i=1}^{n} (s_i - \bar{s}_i)^2 \quad \cdots J$

SUBJECT TO $\quad \left| \sum_{i=1}^{n} (s_i - \bar{s}_i) \right| \leq q \quad \cdots F$ $s_i = (2k_i + b_i)q$ $s_i > 0$ $k_i \in Z \ (i = 1, 2, \cdots, n)$

FIG. 9A

$$-q \leq \sum_{i=1}^{n}(s_i - \bar{s}_i) \quad \cdots \text{F1}$$

$$\sum_{i=1}^{n}(s_i - \bar{s}_i) \leq q \quad \cdots \text{F2}$$

$$\sum_{i=1}^{n}\{(2-b_i)q - \bar{s}_i\} \leq q \quad \cdots \text{F3}$$

FIG. 9B

$$\hat{s}_i = \left[2 \times \arg_{k_i}\min\{(2k_i + b_i)q - s_i\} + b_i\right]q$$

$$= \left[2 \times \text{round}\frac{\bar{s}_i - b_i q}{2q} + b_i\right]q \ (i = 1, 2, \cdots, n) \quad \cdots \text{F4}$$

FIG. 9C

$$\Delta_{si-2q} J(s) = \{(s_i - 2q) - \bar{s}_i\}^2 - (s_i - \bar{s}_i)^2$$

$$= -4q(s_i - \bar{s}_i) + 4q^2$$

$$s_t \leftarrow s_t - 2q$$

$$t \leftarrow \arg_i \text{mix}(s_i - \bar{s}_i)$$

FIG. 9D

$$\Delta_{si+2q} J(s) = \{(s_i + 2q) - \bar{s}_i\}^2 - (s_i - \bar{s}_i)^2$$

$$= 4q(s_i - \bar{s}_i) + 4q^2$$

$$s_t \leftarrow s_t + 2q$$

$$t \leftarrow \arg_i \min(s_i - \bar{s}_i)$$

FIG. 19

$$P(f) = \sum_{i=1}^{h} (u_{f(i)} - r_i)^2$$

$$f(i) < f(i+1) \ (1 \leq^\forall i \leq h-1)$$

FIG. 20A

| 7 | 11 | 6 | 13 | 15 | 20 | 8 | 13 | 12 | 6 | 19 |

FIG. 20B

| 1 | -1 | 0 | 1 | -3 | 2 | 2 | 1 | 0 | 0 | 1 |

FIG. 20C

| A | A | A | A | B | B | B | A | A | A | A |

EMBEDDING AND EXTRACTING ADDITIONAL INFORMATION IN A DOCUMENT IMAGE

FIELD OF THE INVENTION

The following disclosure relates generally to an apparatus, method, system, computer program and product, each capable of embedding additional information to a document image, and further relates to an apparatus, method, system, computer program and product, each capable of extracting additional information from a document image.

BACKGROUND OF THE INVENTION

Digital watermarking is a technique for embedding additional information to digital data to protect the copyright or integrity of the digital data.

For example, additional information may be embedded to a space between characters, i.e., intercharacter space, as described in any one of the Japanese Patent Laid-Open Publication Nos. H09-186603, 2002-232679, and 2004-023563. If this type of digital watermarking is to be applied, it is desirable to embed the additional information in a manner imperceptible to a human. It is further desirable to embed a large amount of data, as the additional information, to the intercharacter space.

BRIEF SUMMARY OF THE INVENTION

An exemplary embodiment of the present invention includes an apparatus, method, system, computer program and product, each capable of embedding additional information to a document image by: analyzing a layout of a document image, the layout comprising a character line having a plurality of intercharacter spaces, each intercharacter space having an original length; and embedding additional information into the character line by changing the original length to an optimal length for each of the plurality of intercharacter spaces.

In one example, the optimal length may be obtained by performing the steps of: converting the original length to a quantized length for each of the plurality of intercharacter spaces using the additional information; obtaining an accumulated value representing a sum of the differences between the original length and the quantized length of each of the plurality of intercharacter spaces; determining whether the accumulated value is within a range determined by a threshold value to generate a determination result; and adjusting the quantized length of at least one of the plurality of intercharacter spaces based on the determination result to make the accumulated value within the range.

In another example, the optimal length may be obtained by performing the steps of: converting the original length to a quantized length for each of the plurality of intercharacter spaces using the additional information; and adding an arrangement number to the quantized length to generate an added quantized length for each of the plurality of intercharacter spaces.

Another exemplary embodiment of the present invention includes an apparatus, method, system, computer program and product, each capable of extracting additional information from a document image by: analyzing a layout of a document image, the layout comprising a character line having a plurality of intercharacter spaces, each intercharacter space having an extracted length; and extracting additional information from the extracted length of each of the plurality of intercharacter spaces. The extracted additional information may be used to determine integrity, validity, or ownership of the document image, for example.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 8 is a set of functions representing an optimization problem generated during the operation shown in FIG. 7;

FIG. 9A is a set of functions derived from the set of functions shown in FIG. 8;

FIG. 9B is a set of functions representing a solution to the optimization problem shown in FIG. 8;

FIG. 9C is a set of functions derived from the set of functions shown in FIG. 8;

FIG. 9D is a set of functions derived from the set of functions shown in FIG. 8;

FIG. 19 is an illustration for explaining the operation shown in FIG. 18; and

FIGS. 20A to 20C are illustrations for explaining operation of extracting additional information from a document image according to an exemplary embodiment of the present invention.

DETAILED DESCRIPTION OF THE INVENTION

Figure 1:
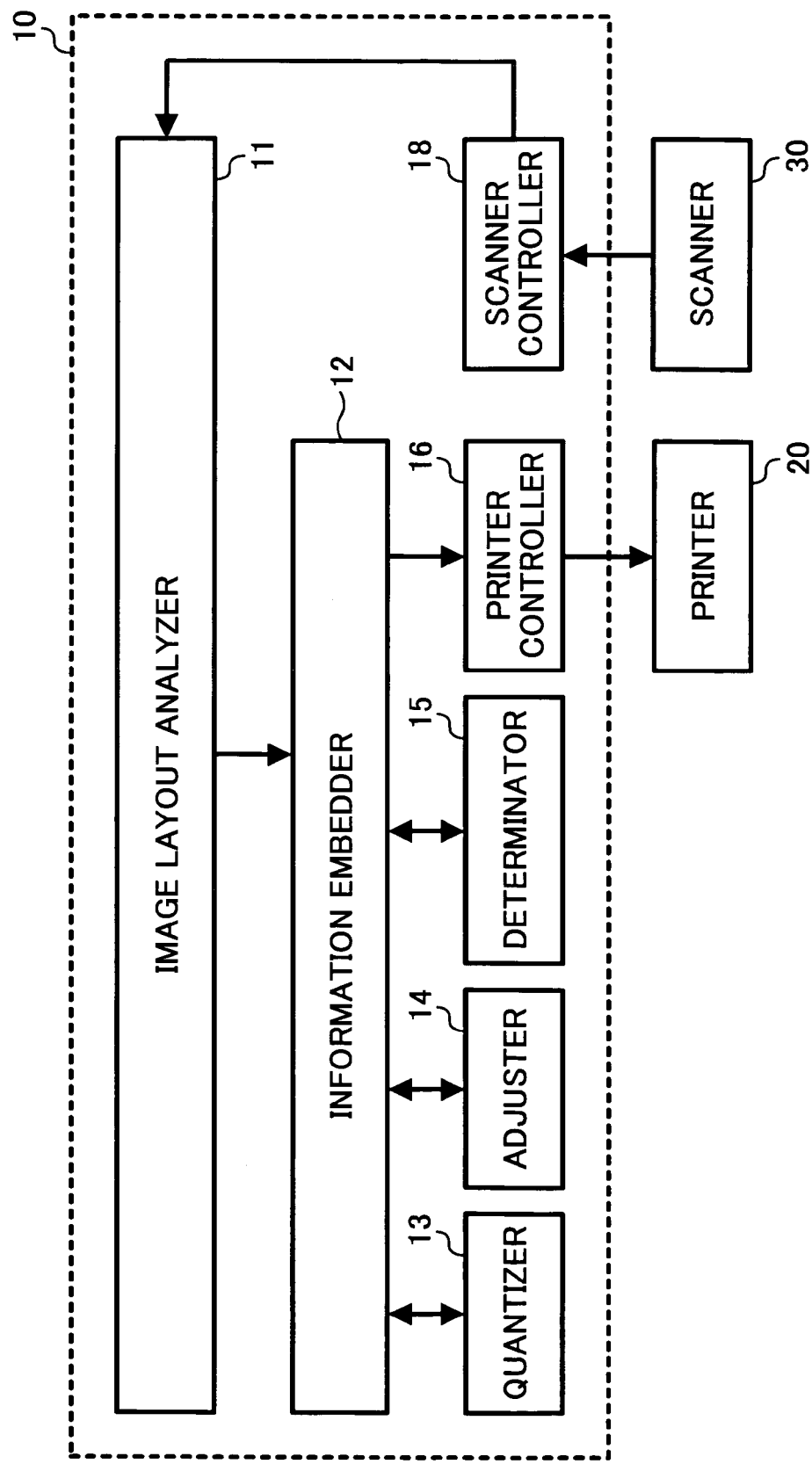
FIG. 1 is a schematic block diagram illustrating the functional structure of an information processing apparatus according to an exemplary embodiment of the present invention.

In describing the exemplary embodiments illustrated in the drawings, specific terminology is employed for clarity. However, the disclosure of this patent specification is not intended to be limited to the specific terminology selected and it is to be understood that each specific element includes all technical equivalents that operate in a similar manner. Referring now to the drawings, wherein like reference numerals designate identical or corresponding parts throughout the several views, FIG. 1 illustrates an information processing apparatus 10 according to an exemplary embodiment of the present invention. The information processing apparatus 10 is capable of embedding additional information to a document image.

As shown in FIG. 1, the information processing apparatus 10 includes an image layout analyzer 11, an information embedder 12, a quantizer 13, an adjuster 14, a determinator 15, a printer controller 16, and a scanner controller 18. Further, the information processing apparatus 10 is connected to a printer 20 and to a scanner 30, via a network such as a local area network (LAN).

The image layout analyzer 11 analyzes the layout of the document image. For example, the image layout analyzer 11 may extract at least one character line as a target character line from the document image, and at least one intercharacter space from the target character line as a target intercharacter space. The information embedder 12 embeds the additional information to the target intercharacter space by changing an original length of the target intercharacter space to an optimal length. The optimal length may be determined by any one of the quantizer 13, the adjuster 14, and the determinator 15.

In one example, the quantizer 13 obtains the original length for each of the intercharacter spaces extracted by the image layout analyzer 11, and converts the original length to a quantized length using the additional information. The information embedder 12 changes the length of each of the intercharacter space from the original length to the quantized length.

The quantized length may be further adjusted by the adjuster 14, when the determinator 15 determines to adjust any one of the quantized lengths of the intercharacter spaces. For example, the determinator 15 obtains the difference between the original length and the quantized length for each of the intercharacter spaces in the target character line. The determinator 15 further adds the obtained difference values into an accumulated value, and obtains its absolute value ("absolute accumulated value"). If the absolute accumulated value is equal to or less than a threshold value, the determinator 15 determines that the adjustment is not necessary. If the absolute accumulated value is greater than the threshold value, the determinator 15 determines that the adjustment is necessary.

If the determinator 15 determines that adjustment is necessary, the adjuster 14 may select at least one of the intercharacter spaces for adjustment, using any kind of selection method. The adjuster 14 adjusts the quantized length of the selected intercharacter space by a predetermined amount in order to make the absolute accumulated value to be equal to or less than the threshold value. Once the quantized length has been adjusted, the adjuster 14 may cause the information embedder 12 to change the length of the selected intercharacter space from the original length to the adjusted quantized length, or from the quantized length to the adjusted quantized length.

In another example, the quantized length may be further added with an arrangement number, which may be selected from a sequence of arrangement numbers. The sequence of arrangement numbers may be generated as a sequence of random numbers, or it may be generated as a sequence of predetermined numbers. The arrangement number may be used to determine integrity of the document image.

The scanner controller 18 allows the information processing apparatus 10 to communicate with the scanner 30, or it allows the apparatus 10 to control the scanner 30. The scanner controller 18 may be implemented by a scanner driving program, for example. The printer controller 16 allows the information processing apparatus 10 to communicate with the printer 20, or it allows the apparatus 10 to control the printer 20. The printer controller 16 may be implemented by a printer driving program, for example.

Figure 2:
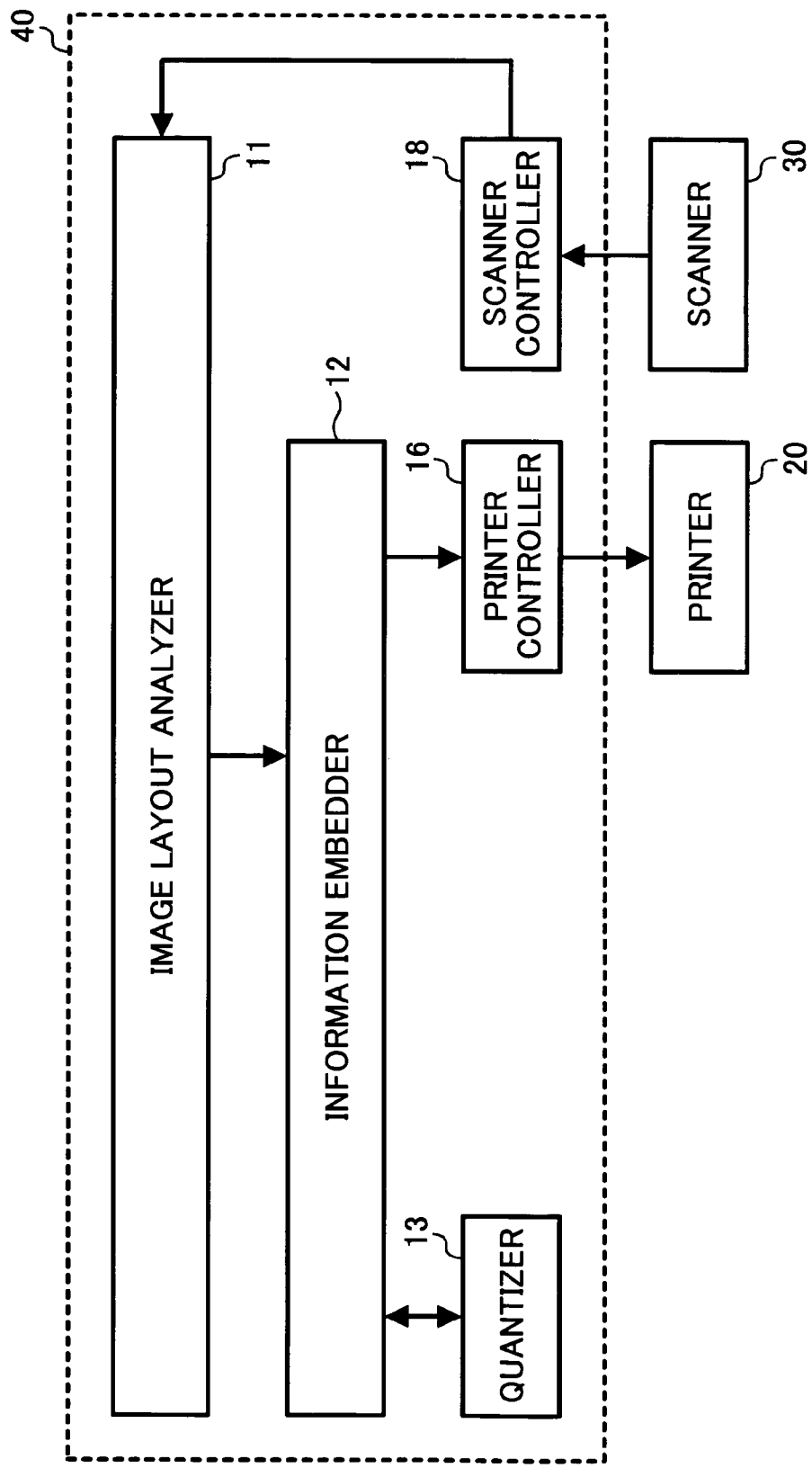
FIG. 2 is a schematic block diagram illustrating the functional structure of an information processing apparatus according to an exemplary embodiment of the present invention.
Figure 3:
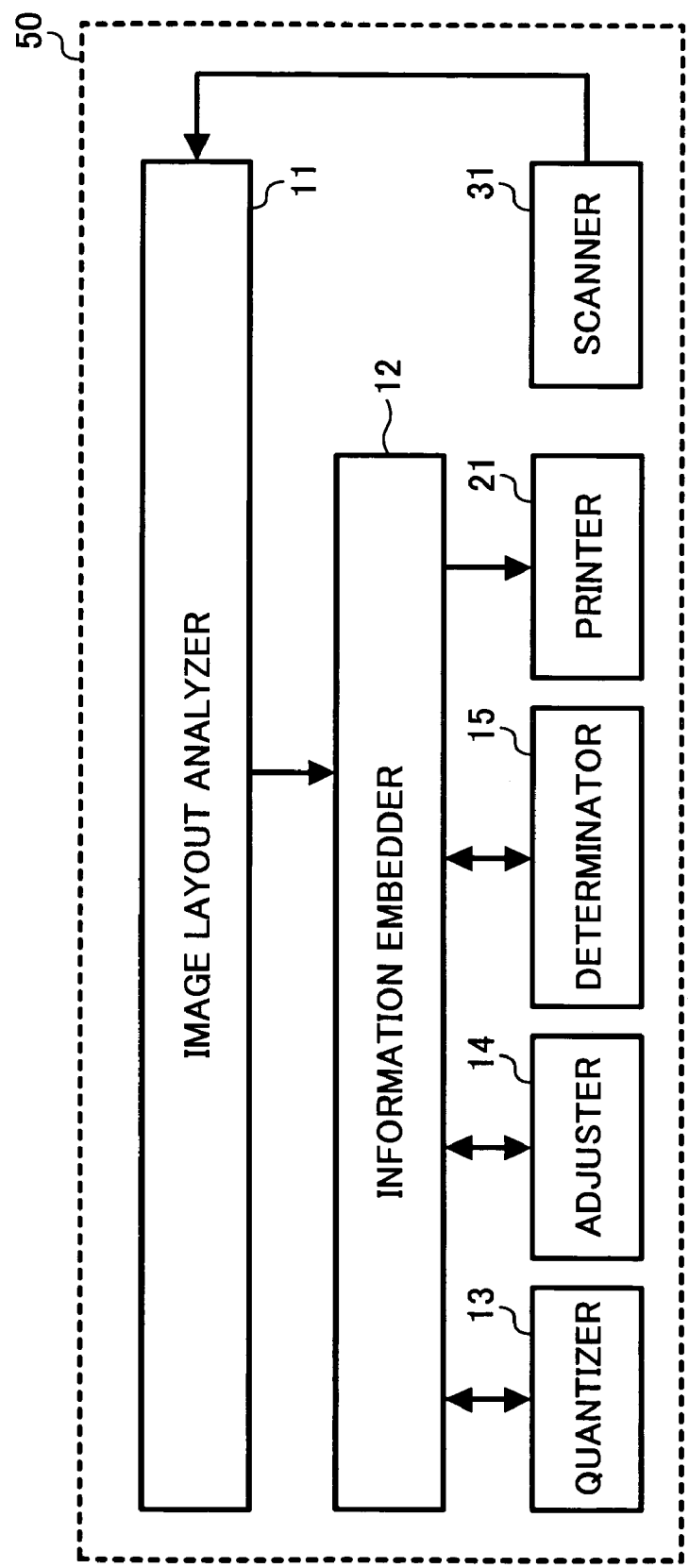
FIG. 3 is a schematic block diagram illustrating the functional structure of an information processing apparatus according to an exemplary embodiment of the present invention.

In addition to the information processing apparatus 10 shown in FIG. 1, operation of embedding additional information to a document image may be performed by various other information processing apparatuses, for example, by an information processing apparatus 40 shown in FIG. 2 or an information processing apparatus 50 shown in FIG. 3.

The information processing apparatus 40 of FIG. 2 is substantially similar in functional structure to the information processing apparatus 10 of FIG. 1. The differences include the deletion of the adjuster 14 and the determinator 15.

The information processing apparatus 50 of FIG. 3 is substantially similar in functional structure to the information processing apparatus 10 of FIG. 1. The differences include the replacement of the printer controller 16 with a printer 21, and the replacement of the scanner controller 18 with a scanner 31.

The printer 21 is capable of printing various data, such as a document image processed by the information embedder 12, for example. The scanner 31 is capable of scanning various document images, such as a document image to be processed by the image layout analyzer 11.

Figure 4:
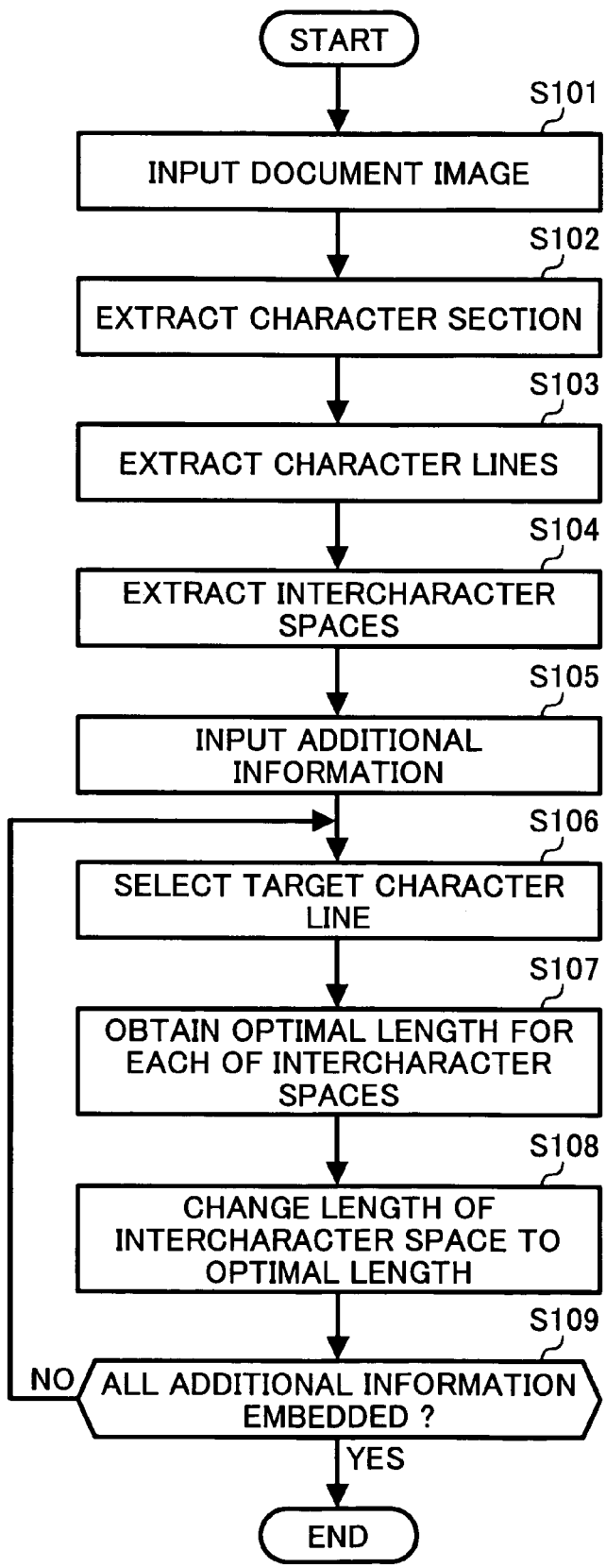
FIG. 4 is a flowchart illustrating operation of embedding additional information to a document image according to an exemplary embodiment of the present invention.

Referring now to FIG. 4, operation of embedding additional information to a document image is explained according to an exemplary embodiment of the present invention. The steps illustrated in FIG. 4 may be performed by any one of the information processing apparatuses 10, 40, and 50 when it receives an instruction for embedding additional information to a document image from a user. The user may generate the instruction in various ways, for example, as illustrated in any one of FIGS. 12 and 14, which will be later described. For the illustrative purpose, the following describes when the operation of FIG. 4 is performed by the information processing apparatus 10 of FIG. 1.

In Step S101, the image layout analyzer 11 inputs a document image to be processed. In one example, the image layout analyzer 11 may obtain a document image, which has been scanned by the scanner 30 through the scanner controller 16. In another example, the image layout analyzer 11 may obtain a document image, which has been generated using any kind of application software.

In Step S102, the image layout analyzer 11 extracts a character section including a plurality of characters from the document image, for example, using any kind of image segmentation method.

In Step S103, the image layout analyzer 11 extracts one or more character lines from the character section, for example, using any kind of character line extracting method.

In Step S104, the image layout analyzer 11 extracts one or more intercharacter spaces from each of the character lines. In one example, the image layout analyzer 11 may generate a histogram indicating a number of black pixels along the subscanning direction of the document image. Using this histogram, a continuous run of white pixels having a length larger than a predetermined value may be extracted as an intercharacter space. Depending on the predetermined value, the intercharacter space may sometimes include the space within one character, the space between the character lines, or the space made by a photograph, drawing, or table, etc.

In this step, if a multivalue color image is to be processed, one of the primitive colors such as red, green or blue may be selected to generate a histogram. Alternatively, the multivalue color image may be converted to a chromatic portion and a luminance portion, and the luminance portion may be used to generate a histogram.

In Step S105, the information embedder 12 allows the user to input the additional information. For example, the information processing apparatus 10 may be provided with or connected to a display capable of displaying information. Using the display, the information processing apparatus 10 may request the user to input arbitrary information, such as a number or a character, for example, as the additional information. Alternatively, the information processing apparatus 10 may request the user to select a specific data file having information to be embedded. Further, in this example, the amount of the additional information may be previously set or it may be set according to user's preferences, as long as it is within a limit determined by the number of intercharacter spaces extracted in Step S104.

In Step S106, the information embedder 12 selects a target character line, from the character lines extracted in Step S103, to which the additional information is embedded. In one example, the target character line may be selected in an order from the upper left side to the lower right side of the document image.

Figure 5A:
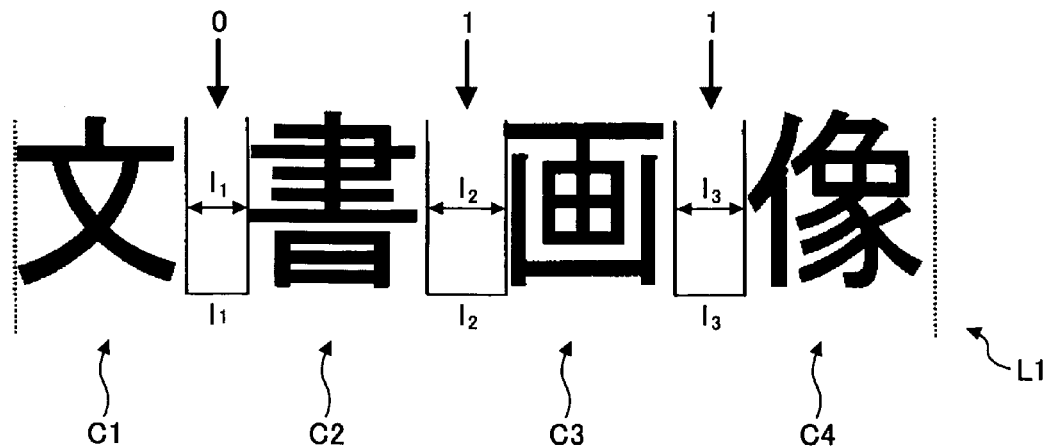
FIGS. 5A to 5C are illustrations for explaining the operation shown in FIG. 4.

For the illustrative purposes, the following assumes that a character line L1 shown in FIG. 5A has been selected as a target character line. As shown in FIG. 5A, the character line L1 includes four Chinese characters C1, C2, C3 and C4, and three intercharacter spaces l1, l2, and l3. The intercharacter space l1, which is located between the characters C1 and C2, has an original length l1. The intercharacter space l2, which is located between the characters C2 and C3, has an original length l2. The intercharacter space l3, which is located between the characters C3 and C4, has an original length l3. Further, in this example, the additional information "011" is embedded to the target character line L1. More specifically, as illustrated in FIG. 5A, the bit 0 is embedded to the intercharacter space l1. The bit 1 is embedded to the intercharacter space l2. The bit 1 is embedded to the intercharacter space l3.

In Step S107 of FIG. 4, the information embedder 12 obtains an optimal length for each of the intercharacter spaces in the target character line. In this example, the optimal length corresponds to a quantized length obtained by the quantizer 13, which may be later adjusted by the adjuster 14 based on determination made by the determinator 15.

In one example, the information embedder 12 may first obtain a quantized length, which has been calculated by the quantizer 13 based on the original length of each of the intercharacter spaces.

In the exemplary case referring to FIG. 5A, the quantizer 13 obtains a quantized length of the intercharacter space, which approximates the corresponding original length by multiplying a constant number q with an even or odd number. If "0" is embedded to the intercharacter space, the original length of the intercharacter space is approximated by multiplying the constant number q with the even number. If "1" is embedded to the intercharacter space, the original length of the intercharacter space is approximated by multiplying the constant number q with the odd number. More specifically, a quantized length 2q, a quantized length 3q, and a quantized length 3q are obtained respectively for the intercharacter space l1, the intercharacter space l2, and the intercharacter space l3.

Still referring to Step S107 of FIG. 4, the quantized length of any one of the intercharacter spaces may be further adjusted by the adjuster 14 by a predetermined amount, if the determinator 15 determines that such adjustment is necessary.

Figure 5B:
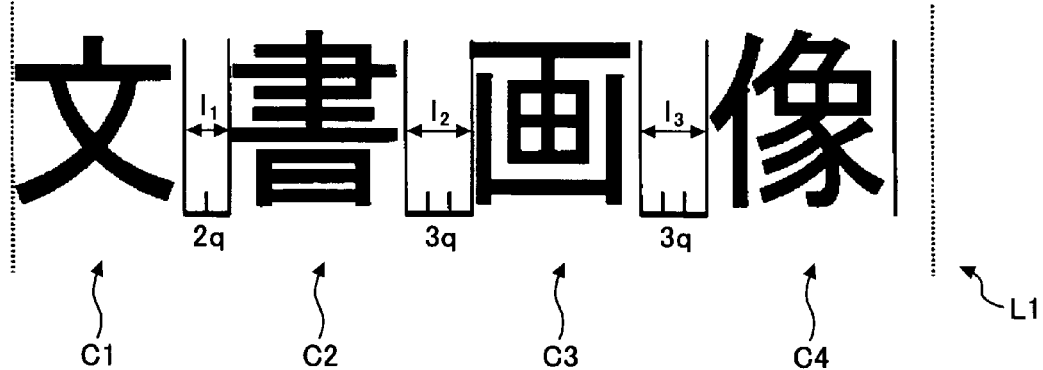

Referring to FIGS. 5A and 5B, the determinator 15 obtains the difference between the original length l1 and the quantized length 2q, the difference between the original length l2 and the quantized length 3q, and the difference between the original length l3 and the quantized length 3q, to obtain the accumulated value e. Alternatively, the accumulated value e may be obtained as the difference between an original length and a quantized length of the character line L1. The quantized length of the character line L1 corresponds to the length of the character line L1 after the quantization process.

The determinator 15 determines to adjust the quantized length of any one of the intercharacter spaces l1, l2, and l3, if the accumulated value e falls outside a range determined by a threshold value. If the accumulated value e falls outside the range, the adjuster 14 selects one of the intercharacter spaces l1, l2, and l3 for adjustment.

Figure 5C:
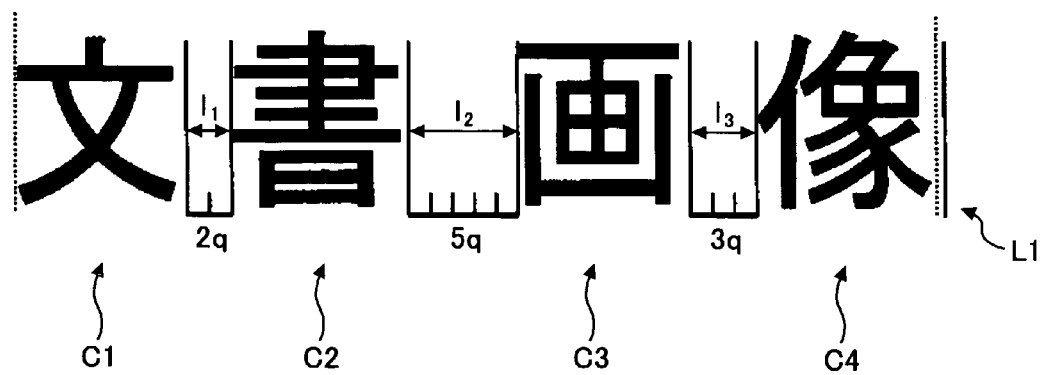

For example, as illustrated in FIG. 5C, the adjuster 14 may select the intercharacter space l2, and adjusts the quantized length 3q by a predetermined amount, for example, by the length 2q. With this adjustment, the accumulated value e can be made within the range.

In Step S108 of FIG. 4, the information embedder 12 changes the original length of each of the intercharacter spaces according to the optimal length obtained in Step S107.

In Step S109, the information embedder 12 determines whether the additional information input in Step S105 has been embedded in the document image. If the additional information has been embedded ("YES" in Step S109), the operation ends. Otherwise ("NO" in Step S109), the operation returns to Step S106 to select another target character line.

In this example, as illustrated in any one of FIGS. 5A to 5C, the accumulated value e has been generated at the right side of the target character line L1 in the document image. However, the accumulated value e may be generated at the left side of the target character line L1, or it may be generated at both sides of the target character line L1, for example, depending on the layout of the character line L1. Further, the layout of the character line L1 may be changed after the operation shown in FIG. 2.

Figure 6:
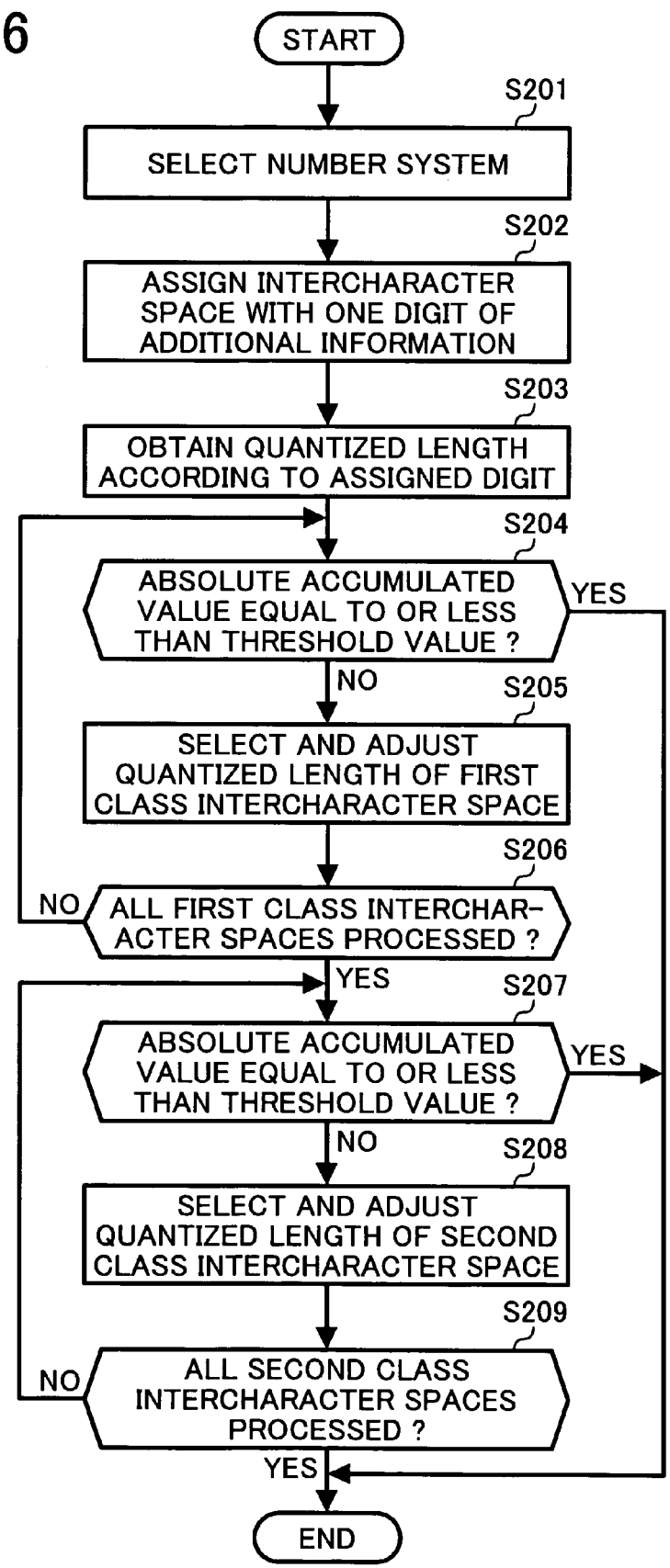
FIG. 6 is a flowchart illustrating operation of obtaining an optimal length of an intercharacter space in a document image according to an exemplary embodiment of the present invention.
Figure 7:
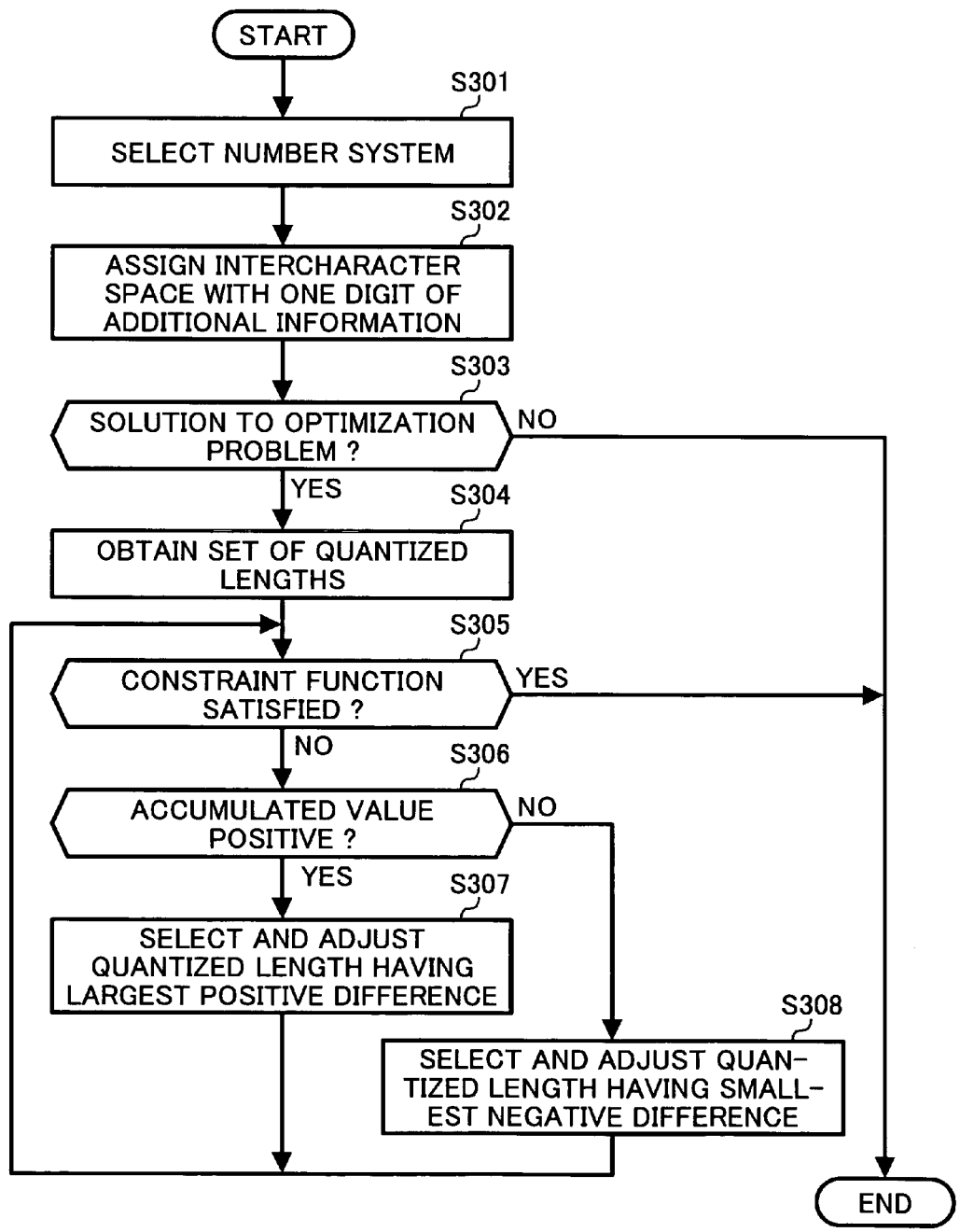
FIG. 7 is a flowchart illustrating operation of obtaining an optimal length of an intercharacter space in a document image according to an exemplary embodiment of the present invention.

As described above referring to FIG. 4, an optimal length of an intercharacter space may be obtained in various ways, for example, as illustrated in any one of FIGS. 6, 7, and 8.

Referring now to FIG. 6, operation of obtaining an optimal length is explained according to an exemplary embodiment of the present invention. The steps illustrated in FIG. 6 may be performed in Step S107 of FIG. 4.

In Step S201, the quantizer 13 selects a number system for expressing the additional information. In one example, the additional information may be expressed based on a binary system with the digits formed by the numbers 0 or 1, i.e., the bits. In another example, the additional information may be expressed based on a decimal system with the digits formed by the numbers 0 through 9. In another example, the additional information may be expressed based on a base N system with the digits formed by the numbers 0 through (N−1), with N corresponding to any integer.

In Step S202, the quantizer 13 assigns each of the intercharacter spaces in the target character line with corresponding one of the digits of the additional information. For example, the quantizer 13 may assign the intercharacter spaces in the order from the left side to the right side of the target character line.

In Step S203, the quantizer 13 obtains a quantized length for each of the intercharacter spaces. The quantized length may be obtained by approximating the corresponding original length with the value expressed by the equation (N*k+b)*q, with N corresponding to the base number determined in Step S201, k corresponding to an integer, b corresponding to the assigned digit, and q corresponding to a constant number representing the quantization unit.

In one example, if the bit "0" is assigned as the additional information under the binary system (N=2), the quantizer 13 obtains a quantized length by approximating the corresponding original length with the value 2kq, or 2q if k is equal to 1.

In another example, if the bit "1" is assigned as the additional information under the binary system, the quantizer 13 obtains a quantized length by approximating the corresponding original length with the value (2k+1)q, or 3q if k is equal to 1.

In another example, if the digit "0" is assigned as the additional information under the ternary system (N=3), the quantizer 13 obtains a quantized length by approximating the corresponding original length with the value 3kq.

In another example, if the digit "1" is assigned as the additional information under the ternary system, the quantizer 13 obtains a quantized length by approximating the corresponding original length with the value (3k+1)q.

In another example, if the digit "2" is assigned as the additional information under the ternary system, the quantizer 13 obtains a quantized length by approximating the corresponding original length with the value (3k+2)q.

In Step S204, the determinator 15 determines whether the absolute accumulated value is equal to or less than a threshold value θ. If the absolute accumulated value is equal to or less than the threshold value θ ("YES" in Step S204), the operation ends to proceed to Step S108 of FIG. 4, for example. Otherwise ("NO" in Step S204), the operation proceeds to Step S205.

In Step S205, the adjuster 14 classifies the intercharacter spaces into a first class of intercharacter spaces each having the difference value assigned with the same sign with the sign of the accumulated value, and a second class of intercharacter spaces each having the difference value assigned with the opposite sign from the sign of the accumulated value.

For example, if the accumulated value is positive, the intercharacter spaces belonging to the first class each have the positive sign, while the intercharacter spaces belonging to the second class each have the negative sign. In another example, if the accumulated value is negative, the intercharacter spaces belonging to the first class each have the negative sign, while the intercharacter spaces belonging to the second class each have the positive sign.

Still referring to Step S205, once the intercharacter spaces are classified into two classes, the adjuster 14 selects one of the intercharacter spaces having the largest difference value from the first class of the intercharacter spaces. The adjuster 14 then adjusts the quantized length of the selected intercharacter space to make the absolute accumulated value smaller.

In one example, if the accumulated value is positive, the adjuster 14 selects one of the intercharacter spaces having the largest positive difference value. The adjuster 14 subtracts the predetermined amount (N*q) from the quantized length of the selected intercharacter space. In another example, if the accumulated value is negative, the adjuster 14 selects one of the intercharacter spaces having the largest negative difference value. The adjuster 14 adds the predetermined amount (N*q) to the quantized length of the selected intercharacter space.

In Step S206, the adjuster 14 determines whether all intercharacter spaces belonging to the first class have been processed or adjusted. If all intercharacter spaces have been processed ("YES" in Step S206), the operation proceeds to Step S207. Otherwise ("NO" in Step S206), the operation returns to Step S204.

In Step S207, the determinator 15 determines whether the absolute accumulated value is equal to or less than the threshold value θ. If the absolute accumulated value is equal to or less than the threshold value θ ("YES" in Step S207), the operation ends to proceed to Step S108 of FIG. 4, for example. Otherwise ("NO" in Step S207), the operation proceeds to Step S208.

In Step S208, the adjuster 14 selects one of the intercharacter spaces having the smallest difference value from the second class of the intercharacter spaces. The adjuster 14 then adjusts the quantized length of the selected intercharacter space to make the absolute accumulated value smaller.

In one example, if the accumulated value is positive, the adjuster 14 selects one of the intercharacter spaces having the smallest negative difference value. The adjuster 14 adds the predetermined amount (N*q) to the quantized length of the selected intercharacter space. In another example, if the accumulated value is negative, the adjuster 14 selects one of the intercharacter spaces having the smallest positive value. The adjuster 14 subtracts the predetermined amount (N*q) from the quantized length of the selected intercharacter space.

In Step S209, the adjuster 14 determines whether all intercharacter spaces belonging to the second class have been processed or adjusted. If all intercharacter spaces have been processed ("YES" in Step S209), the operation ends. Otherwise ("NO" in Step S209), the operation returns to Step S207.

In this example, the constant number q may be previously set or it may be set according to user' preferences. In one example, the value of q may be determined by trading off between the processing speed and the image quality, as the increased q may increase the processing speed while the decreased q may increase quality of the processed document image. In another example, the value of q may be determined based on a resolution of the document image, since the q value is observed to be substantially proportional to the resolution of the document image. For example, if the document image has the resolution of 600 dpi, the value of q may be preferably set to 7. Further, the value of q may be preferably set to be an odd number. Furthermore, the value of q may be set to be equal to the value of the threshold value θ to suppress image quality degradation in the document image.

Referring now to FIG. 7, operation of obtaining an optimal length is explained according to an exemplary embodiment of the present invention. The steps illustrated in FIG. 7 may be performed in Step S107 of FIG. 4. As described below, the optimal length is obtained by solving an optimization problem describing an optimal length of an intercharacter space.

In Step S301, the quantizer 13 selects a number system for expressing the additional information, in a substantially similar manner as described referring to Step S201 of FIG. 6. In this specific example, the binary system is applied.

In Step S302, the quantizer 13 assigns each of the intercharacter spaces in the target character line with corresponding one of the digits in the additional information, in a substantially similar manner as described referring to Step S202 of FIG. 6.

In Step S303, the quantizer 13 generates an optimization problem, and determines whether there is a solution to the optimization problem.

In this example, the optimization problem may be expressed by a set of functions illustrated in FIG. 8. The function J corresponds to an objective function. The function F corresponds to a constraint function. In this example, n corresponds to the number of intercharacter spaces in a target character line. Si corresponds to the quantized length of the ith intercharacter space. $\overline{S}i$ corresponds to the original length of the ith intercharacter space. q corresponds to a quantization unit.

Further, the three functions listed below the function F define a boundary of the quantized length Si. In this example, since the binary system is applied, the quantized length Si may be expressed as $(2k_i+b_i)q$, with bi corresponding to the bit value to be embedded to the ith intercharacter space, and ki corresponding to a collection Z of integers.

Furthermore, the function F of FIG. 8 may be expressed by two functions F1 and F2 illustrated in FIG. 9A. If $S_i$ can satisfy either of the functions F1 and F2, there is a solution to the optimization problem shown in FIG. 8. Since there is no upper limit for the value of $S_i$, the function F1 can be satisfied for any $S_i$ values. Since the lower limit, i.e., the smallest value of the $S_i$ is $(2-b_i)q$ from the boundary function shown in FIG. 8, the function F2 may be rewritten as the function F3 of FIG. 9A.

Thus, in Step S303, the quantizer 13 determines whether there is a solution that satisfies the function F3 of FIG. 9A. If there is a solution ("YES" in Step S303), the operation proceeds to Step S304. Otherwise ("NO" in Step S303), the operation ends to proceed to Step S108 of FIG. 4, for example. Further, upon ending the operation shown in FIG. 7, an error message may be generated to indicate that no optimal length is available.

In Steps S304 to S308, the quantizer 13 obtains a solution to the optimization problem. In this example, the solution $\hat{S}_i$ may be expressed as the function F4 illustrated in FIG. 9B, which may be derived from the objective function J of FIG. 8. More specifically, the solution $\hat{S}_i$ corresponds to a set of quantized lengths $S_i$, which may be obtained by approximating the corresponding original lengths $\overline{S}_i$, capable of satisfying the constraint function F of FIG. 8.

To obtain the solution $\hat{S}_i$, in Step S304, the quantizer 13 obtains a set of quantized lengths $S_i$, in a substantially similar manner as described referring to FIG. 6.

In Step S305, the determinator 15 determines whether the set of quantized lengths Si obtained in Step S304 satisfies the constraint function F of FIG. 8. If the constraint function F is satisfied ("YES" in Step S305), the operation ends. Otherwise ("NO" in Step S305), the operation proceeds to Step S306.

In Step S306, the adjuster 14 determines whether the sum of the differences, i.e., the accumulated value, is positive. If the accumulated value is positive ("YES" in Step S306), the operation proceeds to Step S307. If the accumulated value is negative ("NO" in Step S306), the operation proceeds to Step S308.

In Step S307, the adjuster 14 selects at least one of the intercharacter spaces each having the positive difference value, from the intercharacter spaces, for adjustment.

From the function shown in FIG. 8, it is known that the quantized length $S_i$ decreases by 2q as $k_i$ decreases by one. Further, when $S_i$ is decreased by 2q, the objective function J decreases by $-4q(S_i-\overline{S}_i)+4q^2$, as shown in FIG. 9C. The objective function J can be minimized by performing operation of decreasing the quantized length $S_i$ of the intercharacter space having the largest difference value $(S_i-\overline{S}_i)$ by 2q, as illustrated in FIG. 9C.

In Step S308, the adjuster 14 selects at least one of the intercharacter spaces each having the negative difference value, from the intercharacter spaces, for adjustment.

From the function shown in FIG. 8, it is known that the quantized length $S_i$ increases by 2q as $k_i$ increases by one. Further, when $S_i$ is increased by 2q, the objective function J increases by $4q(S_i-\overline{S}_i)+4q^2$, as shown in FIG. 9D. The objective function J can be minimized by performing operation of increasing the quantized length $S_i$ of the intercharacter space having the smallest difference value $(S_i-\overline{S}_i)$ by 2q, as illustrated in FIG. 9D.

As illustrated in FIG. 7, Step S307 or S308 may be repeated until the constraint function F shown in FIG. 8 is satisfied.

Figure 10:
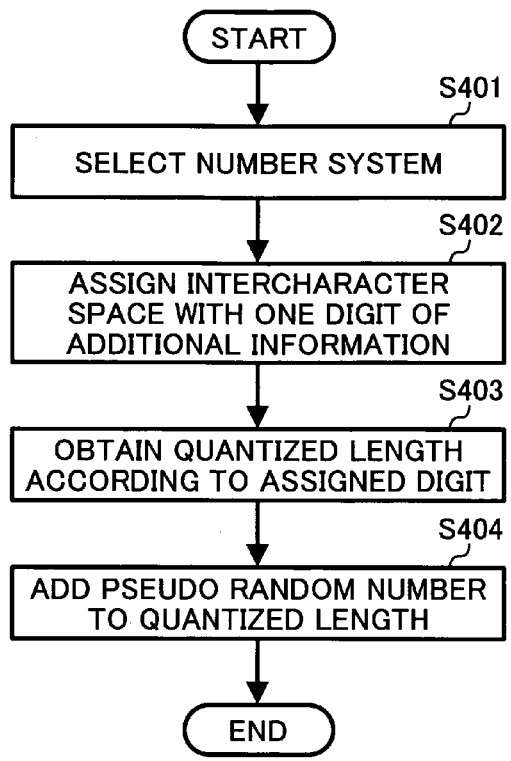
FIG. 10 is a flowchart illustrating operation of obtaining an optimal length of an intercharacter space in a document image according to an exemplary embodiment of the present invention.

Referring now to FIG. 10, operation of obtaining an optimal length is explained according to an exemplary embodiment of the present invention. The steps illustrated in FIG. 10 may be performed in Step S107 of FIG. 4.

In Step S401, the quantizer 13 selects a number system for expressing the additional information, in a substantially similar manner as described referring to Step S201 of FIG. 6.

In Step S402, the quantizer 13 assigns each of the intercharacter spaces in the target character line with corresponding one of the digits in the additional information, in a substantially similar manner as described referring to Step S202 of FIG. 6.

In Step S403, the quantizer 13 obtains a quantized length for each of the intercharacter spaces, in a substantially similar manner as described referring to Step S203 of FIG. 6.

In Step S404, the quantizer 13 generates a sequence of pseudo random numbers, and adds each of the pseudo random numbers to the corresponding one of the quantized lengths obtained in Step S403. For example, in the exemplary case illustrated in FIG. 5B, a pseudo random number r1 may be added to the quantized length 2q of the intercharacter space l1. Similarly, a pseudo random number r2 may be added to the quantized length 3q of the intercharacter space l2. Similarly, a pseudo random number r3 may be added to the quantized length 3q of the intercharacter space l3.

In this example, a pseudo random number is set to be within a range between $-q/2$ and $q/2$, with q corresponding to a constant number representing the quantization unit.

Alternatively, in this step, a sequence of predetermined numbers each having a same unit length may be generated in alternative to the sequence of pseudo random numbers. For example, the quantizer 13 may generate a sequence of 0 having a predetermined unit length, and a sequence of q/2 having the predetermined unit length, which are alternated. If the predetermined unit length is four, this sequence may be described as {0, 0, 0, 0, q/2, q/2, q/2, q/2, . . . }.

After Step S404, the operation of FIG. 10 may end to proceed to Step S108 of FIG. 4, for example. Alternatively, the operation of FIG. 10 may further proceed to operation of adjusting the length of the intercharacter space, as illustrated in any one of FIGS. 6 and 7, for example.

Referring back to FIG. 4, any one of the image processing apparatuses 10, 40 and 50 can perform the operation shown in FIG. 4 upon an instruction received from a user.

Figure 12:
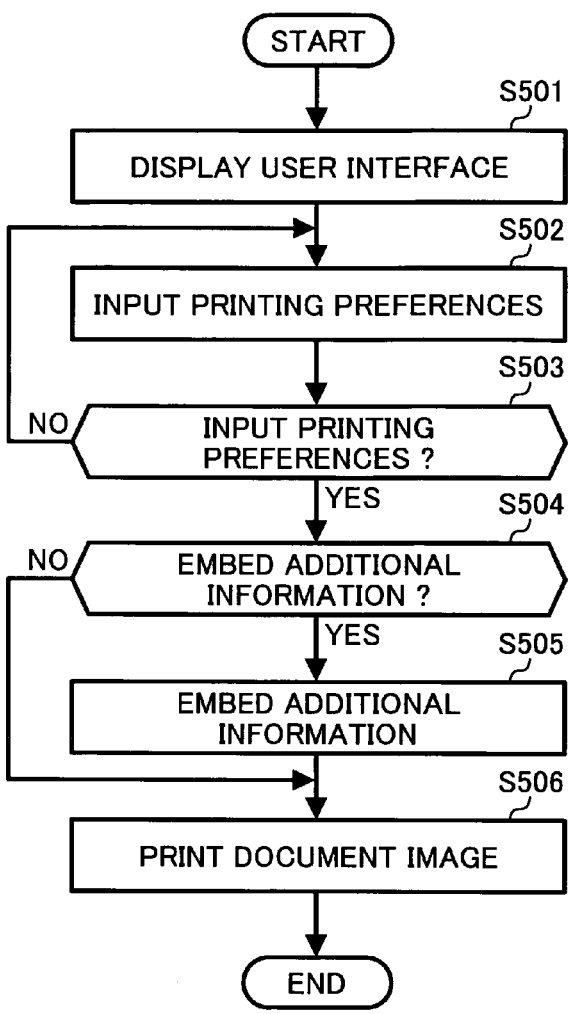
FIG. 12 is a flowchart illustrating operation of receiving an instruction from a user according to an exemplary embodiment of the present invention.

In one example, as illustrated in FIG. 12, the user may open a document image using any kind of application software, such as word processing software, and instruct the information processing apparatuses 10 or 40 to embed additional information to the document image. The operation shown in FIG. 12 may be performed when the information processing apparatus 10 or 40 is implemented by a personal computer (PC) 100 having the hardware structure shown in FIG. 13, for example.

Figure 13:
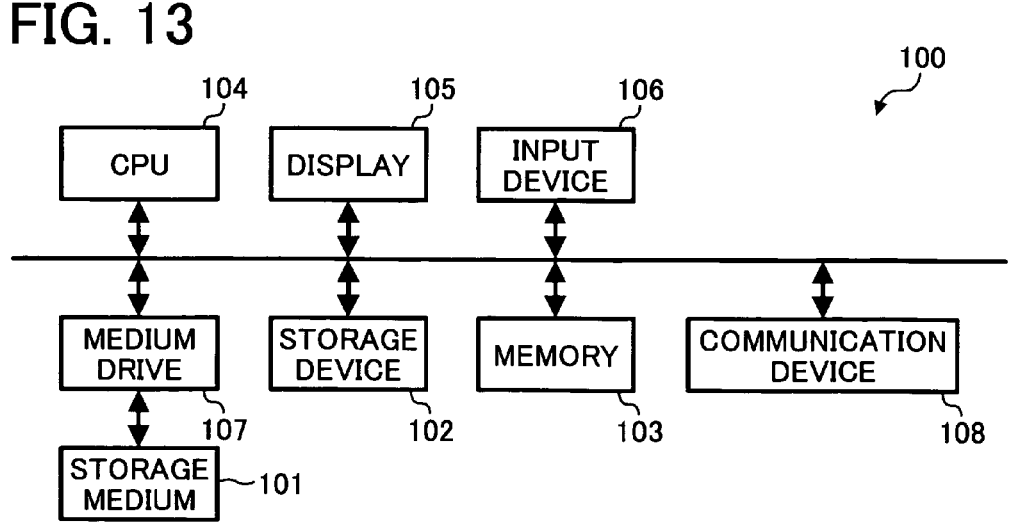
FIG. 13 is a schematic block diagram illustrating the hardware structure of an information processing apparatus according to an exemplary embodiment of the present invention.

As shown in FIG. 13, the PC 100 includes a medium drive 107, a storage medium 101, a storage device 102, a memory 103, a central processing unit (CPU) 104, a display 105, an input device 106, and a communication device 108, which are connected to one another.

The medium drive 107 includes any kind of device capable of reading data from the storage medium 101. The storage medium 101 may store an information embedding program or an information extracting program (collectively referred to as the "information processing program"), which causes the PC 100 to function as the information processing apparatuses 10 or 40. Examples of the storage medium 101 include, but not limited to, optical discs such as CD-ROM, CD-R, CD-RW, DVD-ROM, DVD-RAM, DVD-R, DVD+R, DVD-RW and DVD+RW, magneto optical discs, memory cards, and flexible disks.

The CPU 104 includes any kind of processor capable of controlling operation of the PC 100. The memory 103 includes any kind of involatile or volatile memory, which may be used by the CPU 104. The storage device 102 includes any kind of device capable of storing a large amount of data, such as a hard disk drive, for example.

The input device 106 includes any kind of device capable of inputting data, such as a keyboard or a mouse, for example. The display 105 includes any kind of device capable of displaying, such as a liquid crystal display (LCD), for example. The communication device 108 includes any kind of device allowing the PC 100 to communicate with other apparatuses via a network, such as the Internet, for example.

In one example, the information processing program may be installed onto the storage device 102 from the storage medium 101 storing the information processing program. The information processing program may be further loaded onto the memory 103 upon activation of the CPU 104.

In another example, the information processing program may be downloaded from any other apparatus via the network through the communication device 108. Further, the image processing program may be uploaded from the PC 100 to any other apparatus via the network through the communication device 108.

Referring back to FIG. 12, operation of receiving an instruction from a user, performed by the PC 100, is explained according to an exemplary embodiment of the present invention. The steps illustrated in FIG. 12 may be performed when the user instructs the PC 100 to print the document image using a printer connected to the PC 100.

In Step S501, the CPU 104 displays a user interface on the display 105, such as a print dialog, which requests the user to input printing preferences.

In Step S502, the CPU 104 allows the user to input various printing preferences using the input device 106. For example, the user may indicate whether to embed additional information. Further, the user may determine the content of the additional information, by inputting numerals or characters. Alternatively, the user may select a specific data file storing additional information to be embedded from the storage device 102.

In Step S503, the CPU 104 determines whether printing preferences have been input. If inputting is completed ("YES" in Step S503), the operation proceeds to Step S504. If inputting is not completed ("NO" in Step S503), the operation returns to Step S502 continue inputting.

In Step S504, the CPU 104 starts printing operation by converting the document image according to a format readable to the printer, for example. At the same time, the CPU 104 determines whether embedding of the additional information is required by the user by referring to the printing preferences. If embedding is required ("YES" in Step S504), the operation proceeds to Step S505 to embed the additional information and further to Step S506 to print the document image having the additional information. If embedding is not required ("NO" in Step S504), the operation proceeds to Step S506 to print the document image without embedding additional information.

Figure 14:
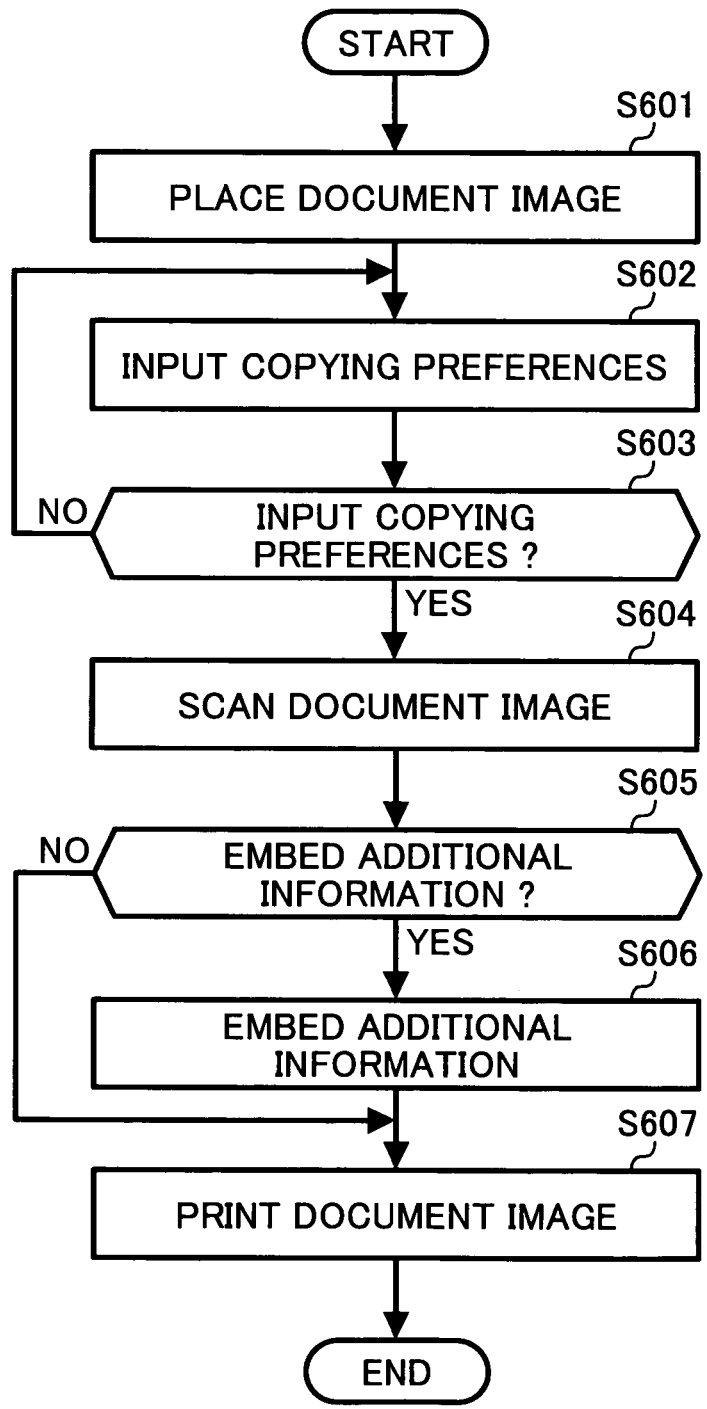
FIG. 14 is a flowchart illustrating operation of receiving an instruction from a user according to an exemplary embodiment of the present invention.

In alternative to the operation shown in FIG. 12, as illustrated in FIG. 14, the user may scan a document image to be processed using a scanner, and instruct the information processing apparatus 50 to embed additional information to the document image. The operation shown in FIG. 14 may be performed when the information processing apparatus 50 is implemented by a multifunctional apparatus (MFP) having the hardware structure shown in FIG. 15, for example.

Figure 15:
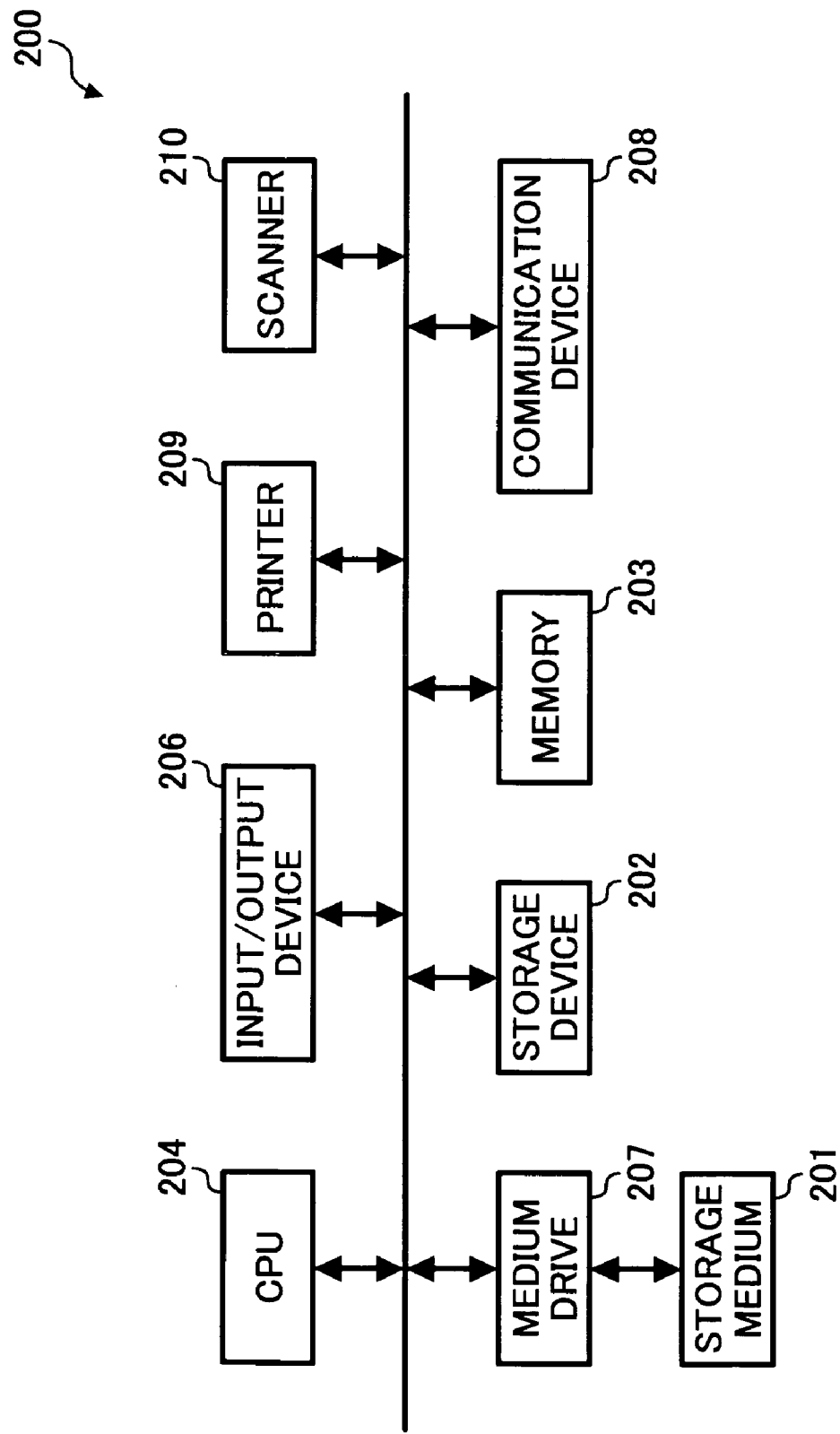
FIG. 15 is a schematic block diagram illustrating the hardware structure of an information processing apparatus according to an exemplary embodiment of the present invention.

As shown in FIG. 15, the MFP 200 includes a medium drive 207, a storage medium 201, a storage device 202, a memory 203, a CPU 204, an input/output device 206, a communication device 208, a printer 209, and a scanner 210, which are connected to one another.

The medium drive 207 includes any kind of device capable of reading data from the storage medium 201. The storage medium 201 may store an information embedding program or an information extracting program (collectively referred to as the "information processing program"), which causes the MFP 200 to function as the information processing apparatus 50. Examples of the storage medium 101 include, but not limited to, optical discs such as CD-ROM, CD-R, CD-RW, DVD-ROM, DVD-RAM, DVD-R, DVD+R, DVD-RW and DVD+RW, magneto optical discs, memory cards, and flexible disks.

The CPU 204 includes any kind of processor capable of controlling operation of the MFP 200. The memory 203 includes any kind of involatile or volatile memory, which may be used by the CPU 204. The storage device 202 includes any kind of device capable of storing a large amount of data, such as a hard disk drive, for example.

The input/output device 206 includes any kind of device capable of inputting data or outputting data, such as an operation panel including a display or a keyboard, for example. The communication device 208 includes any kind of device capable of connecting the MFP 200 to a network, such as the Internet, for example.

The scanner 210 includes any kind of device capable of reading a document image into electronic data. The printer 209 includes any kind of device capable of printing electronic data as a document image.

In one example, the information processing program may be installed onto the storage device 202 from the storage medium 201 storing the information processing program. The information processing program may be further loaded onto the memory 203 upon activation of the CPU 204.

In another example, the information processing program may be downloaded from any other apparatus via the network through the communication device 208. Further, the information processing program may be uploaded from the MFP 200 to any other apparatus through the network through the communication device 208.

Referring back to FIG. 14, operation of receiving an instruction from a user, performed by the MFP 200, is explained according to an exemplary embodiment of the present invention. The steps illustrated in FIG. 14 may be performed when the user instructs the MFP 200 to copy the document image, for example, by selecting a copy button using the input/output device 206.

In Step S601, the user places a document image, for example, onto an exposure glass or an automatic document feeder (ADF) of the MFP 200.

In Step S602, the CPU 204 allows the user to set various copying preferences using the input/output device 206. For example, the user may indicate whether to embed additional information. Further, the user may determine the content of the additional information, by inputting numerals or characters. Alternatively, the user may select a specific data file storing additional information to be embedded from the storage device 202.

In Step S603, the CPU 204 determines whether copying preferences have been input. If inputting is completed ("YES" in Step S603), the operation proceeds to Step S604. If inputting is not completed ("NO" in Step S603), the operation returns to Step S602 to continue inputting.

In Step S604, the scanner 210 scans the document image into electronic data.

In Step S605, the CPU 204 determines whether embedding of the additional information is required by the user by referring to the copying preferences. If embedding is required ("YES" in Step S605), the operation proceeds to Step S606 to embed the additional information and further to Step S607 to print the document image having the additional information. If embedding is not required ("NO" in Step S605), the operation proceeds to Step S607 to print the document image without embedding additional information.

Figure 16:
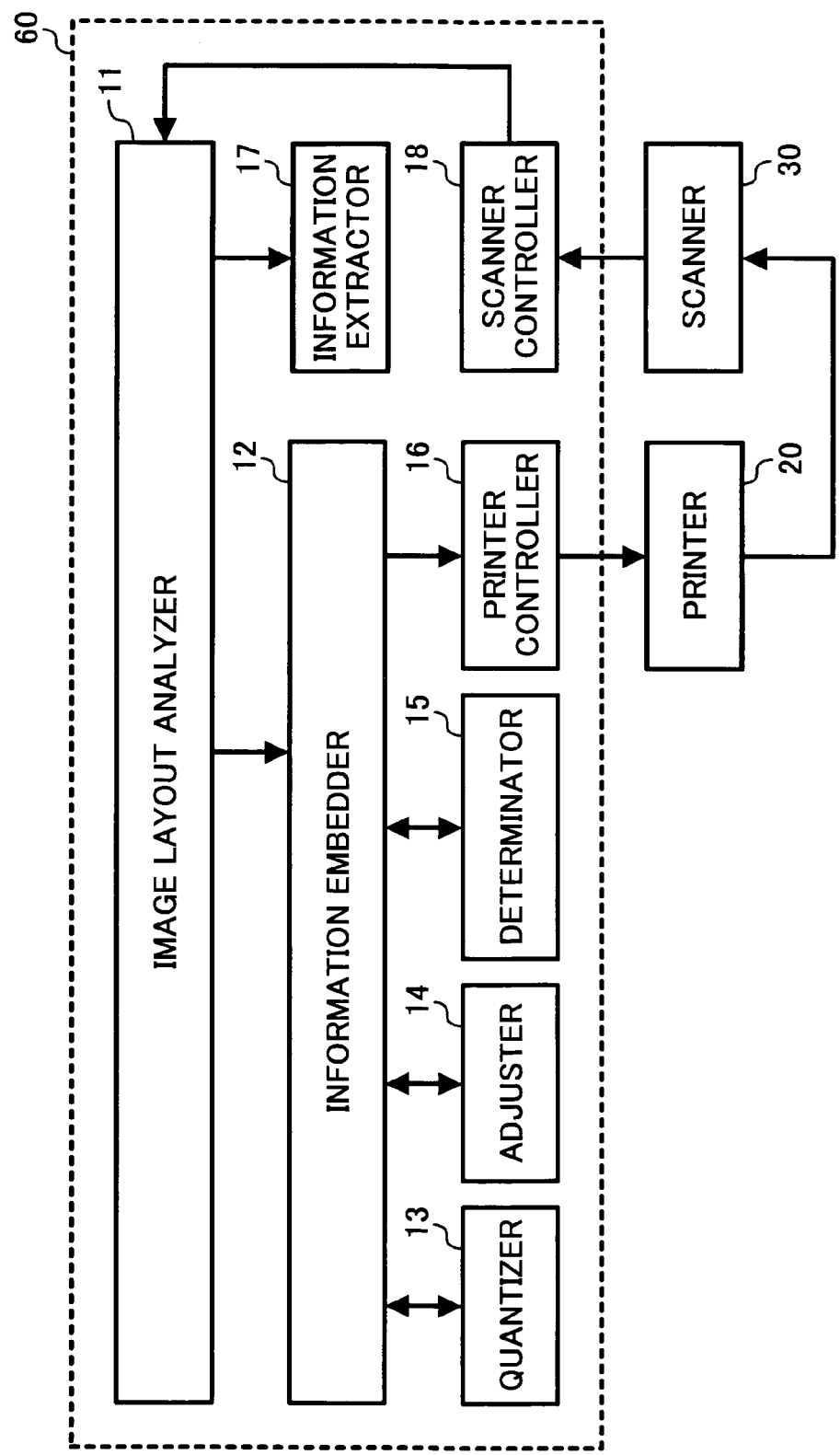
FIG. 16 is a schematic block diagram illustrating the functional structure of an information processing apparatus according to an exemplary embodiment of the present invention.

Referring now to FIG. 16, an information processing apparatus 60 is explained according to an exemplary embodiment of the present invention. The information processing apparatus 60 is capable of embedding additional information to a document image, and further extracting the additional information embedded to the document image.

The information processing apparatus 60 of FIG. 16 is substantially similar in functional structure to the information processing apparatus 10 of FIG. 1. The differences include the addition of an information extractor 17. The information extractor 17 obtains a document image processed by the information embedder 12, and extracts additional information from the document image.

Figure 17:
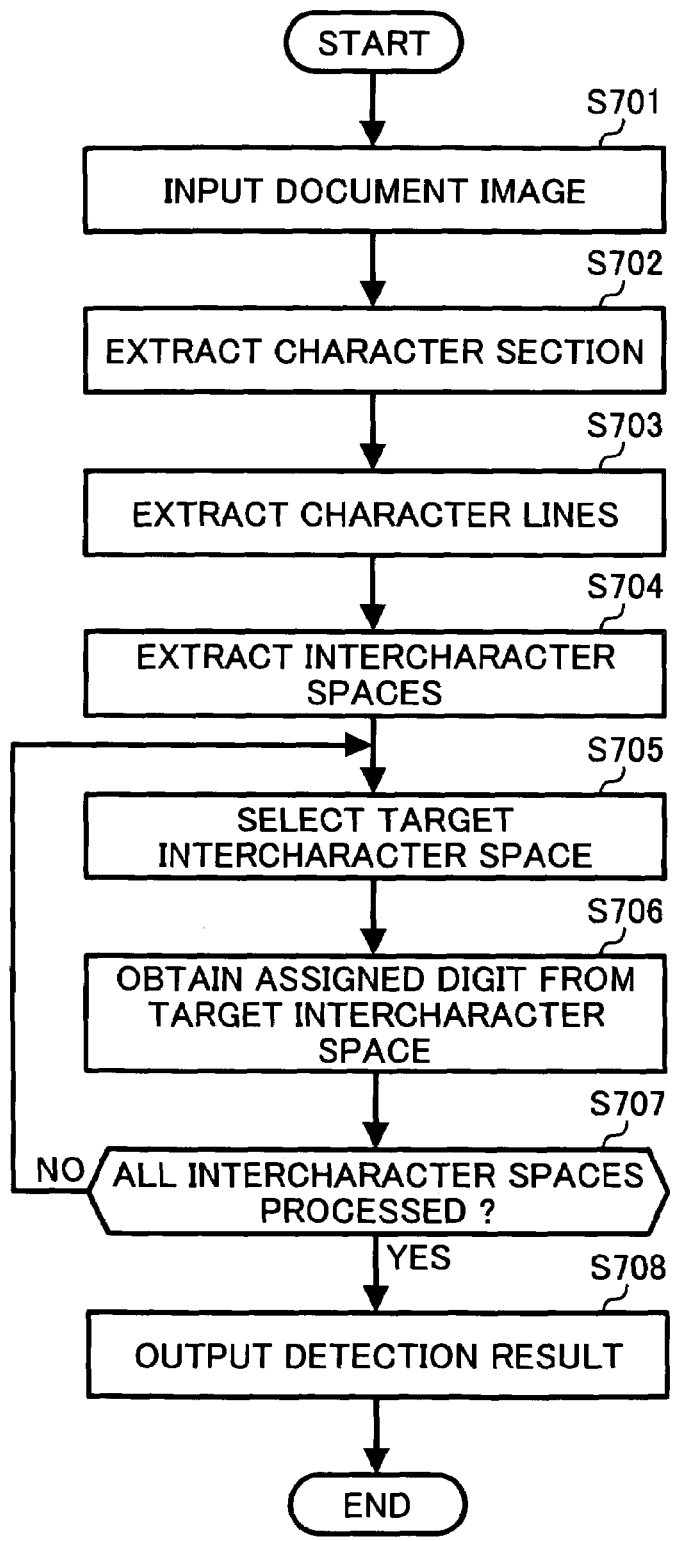
FIG. 17 is a flowchart illustrating operation of extracting additional information from a document image according to an exemplary embodiment of the present invention.

Referring now to FIG. 17, operation of extracting additional information from a document image is explained according to an exemplary embodiment of the present invention. The steps illustrated in FIG. 17 may be performed by the information processing apparatus 60 when it receives an instruction for extracting additional information from a document image from a user.

In Step S701, the image layout analyzer 11 inputs a document image having additional information. In one example, the image layout analyzer 11 may obtain a document image, which has been scanned by the scanner 30 through the scanner controller 16. In another example, the image layout analyzer 11 may obtains a document image, which has been generated using any kind of application software.

In Step S702, the image layout analyzer 11 extracts a character section including a plurality of characters from the document image, in a substantially similar manner as described referring to Step S102 of FIG. 4.

In Step S703, the image layout analyzer 11 extracts one or more character lines from the character section in a substantially similar manner as described referring to Step S103 of FIG. 4.

In Step S704, the image layout analyzer 11 extracts one or more intercharacter spaces from each of the character lines in a substantially similar manner as described referring to Step S104 of FIG. 4.

In Step S705, the information extractor 17 selects a target intercharacter space, from the intercharacter spaces extracted in Step S704.

In Step S706, the information extractor 17 obtains a digit of the additional information, which has been embedded to the target intercharacter space, from the length ("extracted length") of the target intercharacter space.

In one example, the information extractor 17 divides the extracted length by a constant number q, which has been used for embedding, to obtain a quotient value. If the quotient value is not an integer, the information extractor 17 further rounds the quotient value to a nearest integer. Using the quotient value, or the nearest integer, a digit value embedded to the target intercharacter space can be obtained.

For example, as illustrated in FIG. 5C, the intercharacter space 11 has the extracted length 2q. The information extractor 17 divides the extracted length 2q by the constant number q to obtain the quotient value 2. Since the quotient value 2 is an even number, the information extractor 17 determines that the bit 0 has been assigned to the intercharacter space 11.

Similarly, still referring to FIG. 5C, the information extractor 17 may obtain the extracted length 5q of the intercharacter space 12, and divide it by the constant number q to obtain the quotient value 5. Since the quotient value 5 is an odd number, the information extractor 17 determines that the bit 1 has been assigned to the intercharacter space 12.

In another example, the information extractor 17 subtracts a corresponding pseudo random number from the extracted length, and divides the resultant length by the constant number q to obtain a quotient value.

Figure 11:
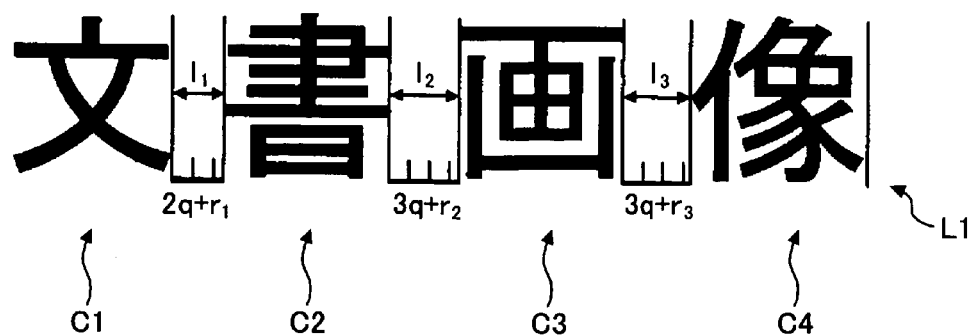
FIG. 11 is an illustration for explaining the operation shown in FIG. 10.

For example, as illustrated in FIG. 11, the intercharacter space 13 has the extracted length (3q+r3). The information extractor 17 subtracts the pseudo random number r3 from the extracted length (3q+r3), and divides the resultant length 3q by the constant number q to obtain the quotient value 3. Since the quotient value 3 is an odd number, the information extractor 17 determines that the bit 1 has been assigned to the intercharacter space 13.

In Step S707, the information extractor 17 determines whether all intercharacter spaces extracted in Step S704 have been processed. If all intercharacter spaces have been processed ("YES" in Step S707), the operation proceeds to Step S708. Otherwise ("NO" in Step S707), the operation returns to Step S705 to select another target intercharacter space.

In Step S708, the information extractor 17 outputs a detection result, indicating whether the additional information extracted in Step S706 matches the additional information that has been embedded. Using this detection result, integrity, validity, or ownership of the document image may be determined. For example, the digits of the additional information extracted in Step S706 may be compared with the digits of the additional information input in Step S105 of FIG. 4 one by one.

Figure 18:
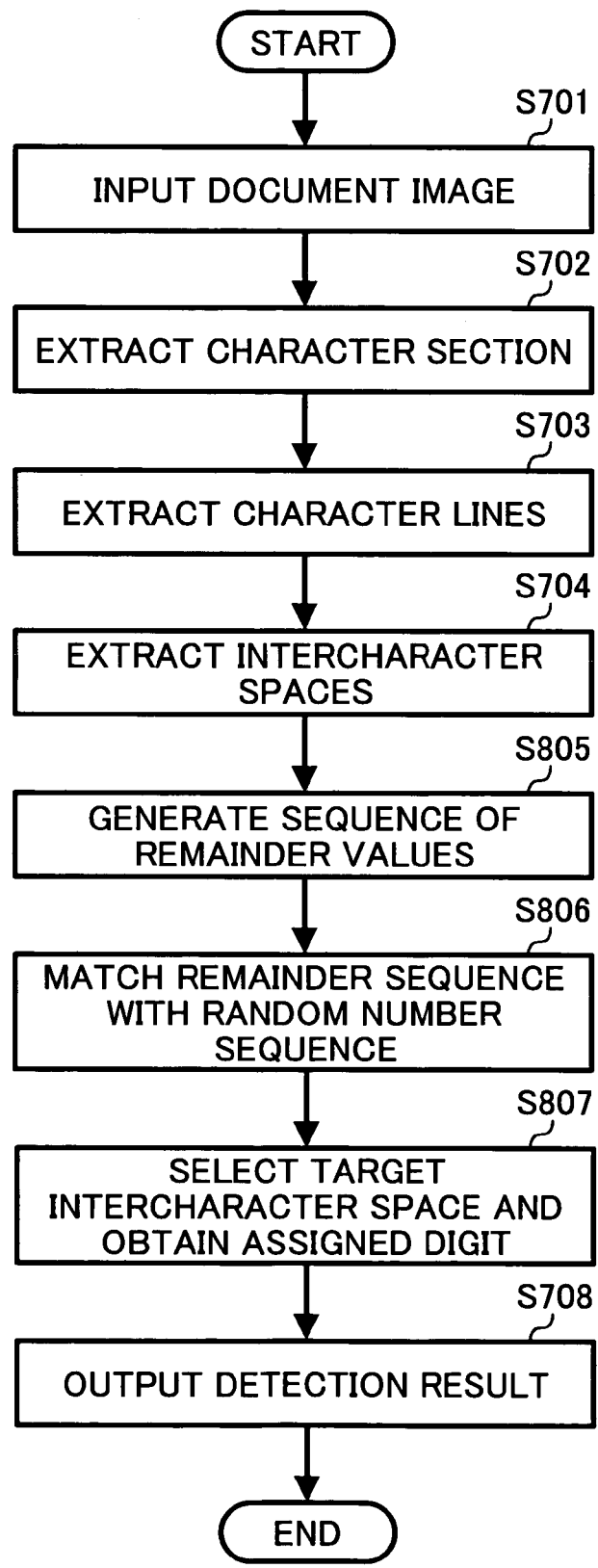
FIG. 18 is a flowchart illustrating operation of extracting additional information from a document image according to an exemplary embodiment of the present invention.

Referring now to FIG. 18, operation of extracting additional information from a document image is explained according to an exemplary embodiment of the present invention. The operation shown in FIG. 18 is substantially similar to the operation shown in FIG. 17. The differences include the replacement of Step S705 with Step S805, replacement of Step S706 with Step S806, and replacemenet of Step S707 with Step S807.

In Step S805, the information extractor 17 obtains the extracted length for each of the intercharacter spaces extracted in Step S704, and divides the extracted length by the constant number q to obtain a remainder value for each of the intercharacter spaces. The obtained remainder values may be expressed as a sequence of the remainder values. In this example, the remainder value may be set to be within a range between $-q/2$ and $q/2$.

In Step S806, the information extractor 17 obtains a sequence of pseudo random numbers, which has been generated by the quantizer 13 during the embedding process. The information extractor 17 compares the sequence of the remainder values with the sequence of pseudo random numbers to generate a comparison result.

In one example, the comparison result may indicate matching between the remainder value sequence and the random number sequence. Matching may be performed using an evaluation function $P(f)$ shown in FIG. 19, for example. In this example, the additional information is assumed to be based on a binary system. More specifically, matching may be achieved by finding a mapping f, which can minimize the value of the evaluation function $P(f)$ while satisfying the constraint function listed below the evaluation function $P(f)$ of FIG. 19. Referring to FIG. 19, h corresponds to a number of bits that has been embedded to the document image. $r_i$ corresponds to a pseudo random number embedded to an ith intercharacter space. f(i) corresponds to mapping from the embedded bit to the extracted bit, i.e., $\{1, 2, \ldots, h\} \otimes \{1, 2, \ldots, g\}$. $u_{f(i)}$ corresponds to a remainder value extracted from the ith intercharacter space at the f(i)th order.

In alternative to the evaluation function shown in FIG. 19, any kind of evaluation functions may be applied. For example, the sum of the absolute errors may be used for the evaluation function. In another example, metaheuristic approach may be used to solve the evaluation function. In another example, the constraint function based on the layout of the document image may be used.

In Step S807, the information extractor 17 determines an order of selecting a target intercharacter space based on the comparison result obtained in Step S806, such as the matching result. According to the determined order, the information extractor 17 selects a target intercharacter space from the intercharacter spaces extracted in Step S704, and obtains a digit embedded to the target intercharacter space in a substantially similar manner as described referring to Step S706 of FIG. 17.

The operation shown in FIG. 18 may be preferably applied to a document image with lower image quality. For example, the quality of the document image may be degraded due to various image processing, such as scanning or printing, which may be applied after the embedding process. If such low quality document image has been processed, the information processing apparatus 60 may not be able to extract the digits of the additional information in a suitable order. By extracting an order determined by the comparison result, the digits of the additional information may be extracted in the suitable order.

Further, as described above referring to FIG. 10, the sequence of predetermined numbers each having a same unit length may be generated instead of the sequence of pseudo random numbers. When the sequence of predetermined numbers has been added, in Step S805 of FIG. 18, the information extractor 17 may obtain the sequence of predetermined numbers in a manner as described below referring to any one of FIGS. 20A to 20C.

Referring back to FIG. 18, in Step S805, the information extractor 17 obtains the extracted length for each of the intercharacter spaces as illustrated in FIG. 20A. In FIG. 20A, each number represents the extracted length of the corresponding intercharacter space.

Further, the information extractor 17 divides the extracted length by the constant number q to obtain a remainder value as illustrated in FIG. 20B. In this example, the sequence of predetermined numbers includes a sequence of 0 having the unit length of four, and a sequence of q/2 having the unit length of four, which are alternated. Further, the constant number q is set to 6.

Using the remainder value, the information extractor 17 can indicate which of the predetermined numbers has been assigned to each intercharacter space. As illustrated in FIG. 20C, the information extractor 17 assigns a label A to the remainder value having the value equal to or greater than $-q/4$ but less than $q/4$, and assigns a label B to the other remainder value. The label A corresponds to the predetermined number 0, while the label B corresponds to the predetermined number q/2.

Further, the information extractor 17 may determine whether the number of consecutive labels matches the unit length. Referring to FIG. 20C, the number of the labels A matches the unit length of four. However, the number of the labels B does not match the unit length of four. In this manner, an error, such as information loss, may be detected before performing Step S806. Upon detecting the error, the operation of FIG. 18 may end without proceeding to Step S806.

Numerous additional modifications and variations are possible in light of the above teachings. It is therefore to be understood that within the scope of the appended claims, the disclosure of this patent specification may be practiced in ways other than those specifically described herein.

For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

This patent application is based on and claims priority to Japanese patent application Nos. 2004-355485 filed on Dec.

8, 2004, and 2005-125305 filed on Apr. 22, 2005, in the Japanese Patent Office, the entire contents of which are hereby incorporated by reference.

What is claimed as new and desired to be protected by Letters Patent of the United States is:

1. An information processing apparatus, comprising:
    means for extracting a character line from a document image, the character line having a plurality of intercharacter spaces, each intercharacter space having an original length;
    means for converting the original length to a quantized length for each of the plurality of intercharacter spaces using additional information;
    means for obtaining an accumulated value representing a sum of the differences between the original length and the quantized length for each of the plurality of intercharacter spaces;
    means for determining whether the accumulated value is within a range determined by a threshold value to generate a determination result; and
    means for adjusting the quantized length of at least one of the plurality of intercharacter spaces based on the determination result to make the accumulated value within the range.

2. The apparatus of claim 1, wherein the additional information includes a plurality of digits each being assigned to the corresponding one of the plurality of intercharacter spaces.

3. The apparatus of claim 2, wherein the quantized length of each of the plurality of intercharacter spaces is an approximation of the corresponding original length, which is generated by using a constant number and the corresponding assigned digit.

4. The apparatus of claim 3, wherein the constant number is substantially equal to the threshold value.

5. The apparatus of claim 1, wherein the means for adjusting comprises:
    means for detecting a sign of the accumulated value,
    wherein the means for adjusting adjusts at least one of the plurality of intercharacter spaces for which the sign of he difference between the original length and the quantized length of the intercharacter space is the same as the sign of the accumulated value.

6. The apparatus of claim 5, wherein the means for adjusting further comprises:
    means for classifying the plurality of intercharacter spaces into a plurality of classes including:
        a first class which includes each of the plurality of intercharacter spaces for which the sign of the differences between the original lengths and the quantized lengths of the intercharacter spaces is the same as the sign of the accumulated value; and
        a second class which includes each of the plurality of intercharacter spaces for which the sign of the differences between the original lengths and the quantized lengths of the intercharacter spaces is opposite the sign of the accumulated value,
    wherein the means for adjusting adjusts at least one of the plurality of intercharacter spaces selected from the first class.

7. The apparatus of claim 6, wherein the means for adjusting further comprises:
    first means for selecting a first target intercharacter space from the first class of the plurality of intercharacter spaces, the first target intercharacter space having the largest difference of the differences between the original length and the quantized length of each of the intercharacter spaces in the first class; and
    first means for changing the quantized length of the first target intercharacter space by a predetermined amount.

8. The apparatus of claim 7, wherein the means for determining comprises:
    means for determining whether the accumulated value is within the range determined by the threshold value to generate a determination result,
    wherein the first means for selecting and the first means for changing respectively repeat selecting and changing until the determination result indicates that the accumulated value is made within the range.

9. The apparatus of claim 8, wherein the means for adjusting further comprises:
    second means for selecting a second target intercharacter space from the second class of the plurality of intercharacter spaces, the second target intercharacter space having the smallest difference of the differences between the original length and the quantized length of each of the intercharacter spaces in the second class; and
    second means for changing the quantized length of the second target intercharacter space by a predetermined amount,
    wherein when the determination result indicates that the accumulated value is not made within the range after the first means for selecting and the second means for changing respectively repeat selecting and changing for all of the plurality of intercharacter spaces belonging to the first class, the second means for selecting and the second means for changing respectively repeat selecting and changing until the determination result indicates that the accumulated value is made within the range.

10. The apparatus of claim 5, wherein when the sign of the accumulated value is positive, the means for adjusting further comprises:
    means for selecting one of the plurality of intercharacter spaces having the largest difference between the original length and the quantized length with a positive sign; and
    means for subtracting a predetermined amount from the quantized length of the selected one of the plurality of intercharacter spaces.

11. The apparatus of claim 5, wherein when the sign of the accumulated value is negative, the means for adjusting further comprises:
    means for selecting one of the plurality of intercharacter spaces having the smallest difference between the original length and the quantized length with a negative sign; and
    means for adding a predetermined amount to the quantized length of the selected one of the plurality of intercharacter spaces.

12. An information processing apparatus, comprising:
    a processor;
    a storage device configured to store a plurality of instructions which, when activated by the processor, cause the processor to:
        extract a character line from a document image, the character line having a plurality of intercharacter spaces, each intercharacter space having an original length;
        convert the original length to a quantized length for each of the plurality of intercharacter spaces using additional information;
        obtain an accumulated value representing a sum of the differences between the original length and the quantized length for each of the plurality of intercharacter spaces;

determine whether the accumulated value is within a range determined by a threshold value to generate a determination result;

adjust the quantized length of at least one of the plurality of intercharacter spaces based on the determination result to make the accumulated value within the range.

13. The apparatus of claim 12, further comprising:
an input device configured to input the additional information.

14. The apparatus of claim 13, further comprising:
an output device configured to output the document image including the character line having the plurality of intercharacter spaces, wherein at least one of the plurality of intercharacter spaces has the adjusted quantized length.

15. A method for embedding additional information to a document image, comprising: using a processor to perform the steps of:

extracting a character line having a plurality of intercharacter spaces from the document image, each intercharacter space having an original length;

converting the original length to a quantized length for each of the plurality of intercharacter spaces using the additional information;

obtaining an accumulated value representing a sum of the differences between the original length and the quantized length for each of the plurality of intercharacter spaces;

determining whether the accumulated value is within a range determined by a threshold value to generate a determination result; and adjusting the quantized length of at least one of the plurality of intercharacter spaces based on the determination result to make the accumulated value within the range.

16. A computer readable medium storing computer instructions which causes a processor to perform an information embedding operation comprising:

extracting a character line from a document image, the character line having a plurality of intercharacter spaces, each intercharacter space having an original length;

converting the original length to a quantized length for each of the plurality of intercharacter spaces using additional information;

obtaining an accumulated value representing a sum of the differences between the original line length and the quantized line length for each of the plurality of intercharacter spaces;

determining whether the accumulated value is within a range determined by a threshold value to generate a determination result; and adjusting the quantized length of at least one of the plurality of intercharacter spaces based on the determination result to make the accumulated value within the range.

17. The apparatus of claim 4, wherein the contact number has a value determined based on a resolution of the document image.

18. The apparatus of claim 3, wherein the means for converting comprises:

means for selecting a number system to be used for forming one or more numbers each expressing the plurality of digits of the additional information, wherein the means for converting further uses a base number of the number system together with the constant number and the assigned digit to generate the quantized length.

19. The apparatus of claim 2, wherein the means for converting comprises:

means for adding an arrangement number selected from a sequence of arrangement numbers to the quantized length for each of the plurality of intercharacter spaces to generate an added quantized length for each of the plurality of intercharacter spaces, wherein the added quantized length is further processed by any one of the means for obtaining, the means for determining, and the means for adjusting.

20. The apparatus of claim 19, wherein the arrangement number is set to be within a range determined by the constant number.

21. The apparatus of claim 1, further comprising:
means for embedding the additional information into the at least one of the plurality of intercharacter spaces having the adjusted quantized length of the character line.

22. The apparatus of claim 21, further comprising:
means for extracting a character line having a plurality of intercharacter spaces each having an extracted length from a document image assumed to be embedded with original additional information; and means for extracting additional information from the extracted length of each of the plurality of intercharacter spaces.

23. The apparatus of claim 19, further comprising:
means for extracting a character line having a plurality of intercharacter spaces each having an extracted length from a document image assumed to be embedded with original additional information; and means for extracting additional information from the extracted length of each of the plurality of intercharacter spaces.

24. The apparatus of claim 23, wherein the means for extracting additional information comprises:

means for generating a sequence of remainder values, each of the remainder values being obtained from the corresponding extracted lengths; and means for comparing the sequence of remainder values with the sequence of arrangement numbers to generate a comparison result, wherein the additional information is extracted in an order determined by the comparison result.

25. The apparatus of claim 24, wherein the means for extracting additional information further comprises:

means for assigning a label to the remainder value for each of the plurality of intercharacter spaces; and means for determining whether the sequence of remainder values matches the sequence of arrangement numbers based on the assigned labels.

26. The apparatus of claim 22, wherein the extracting means further generates a detection result indicating whether the extracted additional information matches the original additional information.

* * * * *

UNITED STATES PATENT AND TRADEMARK OFFICE
CERTIFICATE OF CORRECTION

PATENT NO. : 7,630,514 B2 Page 1 of 1
APPLICATION NO. : 11/296351
DATED : December 8, 2009
INVENTOR(S) : Takayuki Hara It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1034 days.

Signed and Sealed this

Second Day of November, 2010

David J. Kappos
*Director of the United States Patent and Trademark Office*